(No Model.)
H. S. NEWTON.
RAIL BOND.
No. 568,918. Patented Oct. 6, 1896.
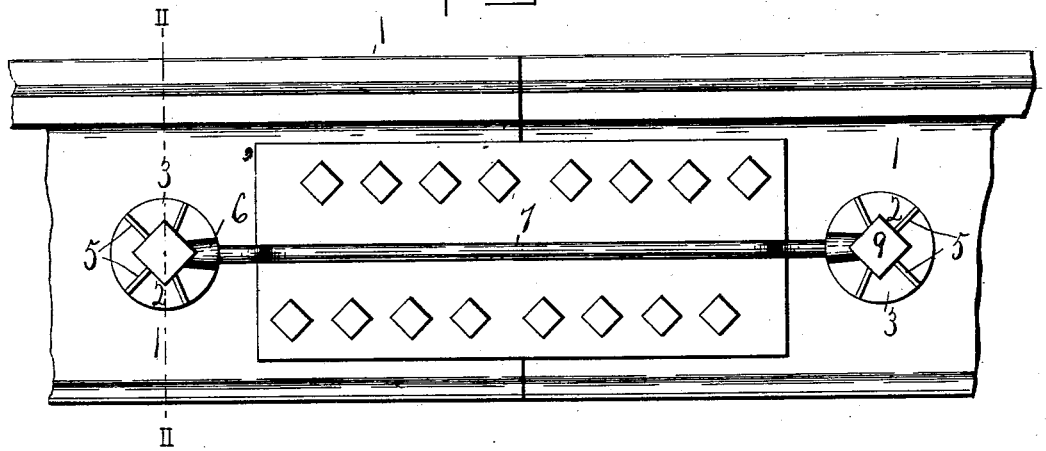
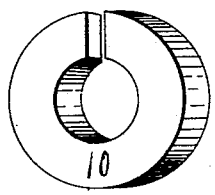
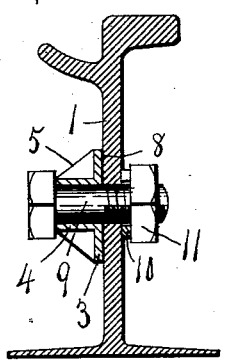
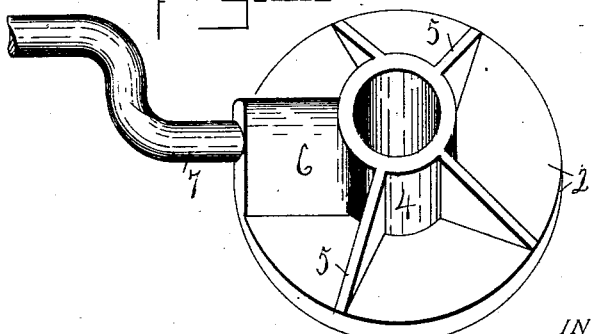
WITNESSES:
C. C. Schorreck
L. F. Weisburg
INVENTOR.
Henry S. Newton
BY Alfred Wilkinson
ATTORNEY.

UNITED STATES PATENT OFFICE.

HENRY S. NEWTON, OF SYRACUSE, NEW YORK.

RAIL-BOND.

SPECIFICATION forming part of Letters Patent No. 568,918, dated October 6, 1896.

Application filed August 10, 1896. Serial No. 602,277. (No model.)

*To all whom it may concern:*

Be it known that I, HENRY S. NEWTON, a citizen of the United States, residing at Syracuse, in the county of Onondaga and State of New York, have invented a new and useful Rail-Bond; and I do hereby declare that the following, in connection with the accompanying drawings, is a full, clear, and exact description of the invention.

My invention relates to rail-bonds for electric railways and the method of securing them in position. It has for its object to produce a new and improved bond which is strong, simple, durable, gives a good contact, and is easy and convenient to attach to the rails.

My bond consists, essentially, of a bond-wire of the usual form and material, preferably soft copper, to the ends of which are attached metallic end pieces or contact-plates, preferably of brass, sufficiently large and solid to present a large surface of contact to the rail and to be perfectly rigid: also, of bolts, nuts, and nut-locks for securing the bond to the rail. Holes having been drilled in the adjacent ends of the webs of the rails, the surface around is faced to make it smooth and clean, so that the smooth face of the contact-plate will fit closely against it. The bond is then easily secured in position by means of the bolts and a good permanent contact is made. I prefer to tin or cover with solder the contact-face of the plate, and after it has been set in position to apply to it heat, by which means the solder is softened and the connection between the bond and the rail made more close and permanent.

My invention will be better understood by reference to the accompanying drawings, in which the same numbers refer to the corresponding parts in all the views.

Figure I is a side elevation of the ends of two rails, showing my bond in position. Fig. II is a vertical section on line II II of Fig. I. Fig. III is a full-size perspective view of one of the contact-plates, showing a portion of the attached wire. Fig. IV is a full-size perspective view of the spring-washer I use to assist in maintaining a good contact.

1 indicates the rails, through which holes are drilled for the attachment of the bond. 2 2 are the contact-plates or end pieces, which must have large, flat, smooth, inner faces for making contact with the rail, and must be sufficiently strong to hold rigidly their position. I have here shown one form by which these advantages are obtained, consisting of the circular contact portion 3 3, the tubular portion 4, stiffening-ribs 5 5, and the enlargement 6, in which a hole is formed sufficiently large to receive the ends of the wire 7, which is there secured by solder, electric welding, or by being cast in place. The inner face 8 of the contact portion is preferably tinned or covered with solder. The face of the rail around the holes for a space corresponding to the size of said contact portion is smoothed off plane and clean. The bond is set in position and there secured by any suitable means, as by bolts 9 and nuts 11. In connection therewith I arrange a spring-washer 10 between the nut and the rail, which performs the double function of nut-lock and of compensating for expansion and contraction, and so assisting in maintaining the contact. This spring-washer is particularly important when tin or solder is not applied to the inner face of the contact-plate. The bond having been thus secured in position, the lineman then sets below each end piece a line-torch, of which he carries two, and the flame enveloping the end piece develops a sufficient degree of heat, while he is setting in place the next bond, to soften the solder, whereby a closer contact and connection is obtained with the smoothed portion of the rail.

This description will make clear not only the construction of my rail-bond, but its simplicity and the convenient method of setting and securing it in position.

Having thus fully described my invention, what I claim, and desire to protect by Letters Patent, is—

1. In combination in a rail-bond, the bond-wire; contact-plates positively attached to the ends thereof, having flat, inner faces, covered with tin or solder, for making contact with the side of the rail; and means for securing the bond in position.

2. In combination in a rail-bond, the bond-wire, contact-plates positively attached to the ends thereof, having flat, inner faces; securing bolts and nuts; and spring-washers arranged between the nut and the rail, for locking the nut and compensating for expansion.

3. In an electric railway, the combination of the rails and bond; the rails having a portion of their surface around the bolt-holes corresponding in area to the size of the contact-plates of the bond faced off smooth; and the bond composed of the wire, and of end pieces secured to the ends thereof, having their comparatively large, inner faces covered with tin or solder for attaching the bond to the smooth surface of the rail, holes through said end pieces corresponding to the bolt-holes in the rails; and bolts and nuts for securing the bond in position.

4. In combination in a rail-bond, the bond-wire; circular contact-plates positively attached to the ends thereof, having smooth inner faces, and outer surfaces provided with reinforcing-ribs; securing bolts and nuts.

5. In combination in a rail-bond, the bond-wire; contact-plates positively attached to the ends of the wire, having a comparatively thin circular contact portion provided with a smooth inner surface for making contact with the rail, an outwardly-extending tubular portion, for receiving the securing-bolt, and reinforcing-ribs; and securing bolts and nuts.

6. As an article of manufacture, a rail-bond consisting of the bond-wire; end pieces or contact-plates secured to the ends thereof; said end pieces having comparatively thin circular contact portions, outwardly-extending tubular portions and reinforcing-ribs, and an enlarged portion on one side of each, provided with an opening fitted to receive the end of the wire.

In witness whereof I have hereunto set my hand, in the presence of two attesting witnesses, at Syracuse, in the county of Onondaga, in the State of New York, this 6th day of August, 1896.

HENRY S. NEWTON.

Witnesses:
C. C. SCHOENECK,
L. F. WEISBURG.